Aug. 15, 1933.                H. TENGSTRÖM                1,922,829
GATE HOISTING SYSTEM
Filed Jan. 20, 1931
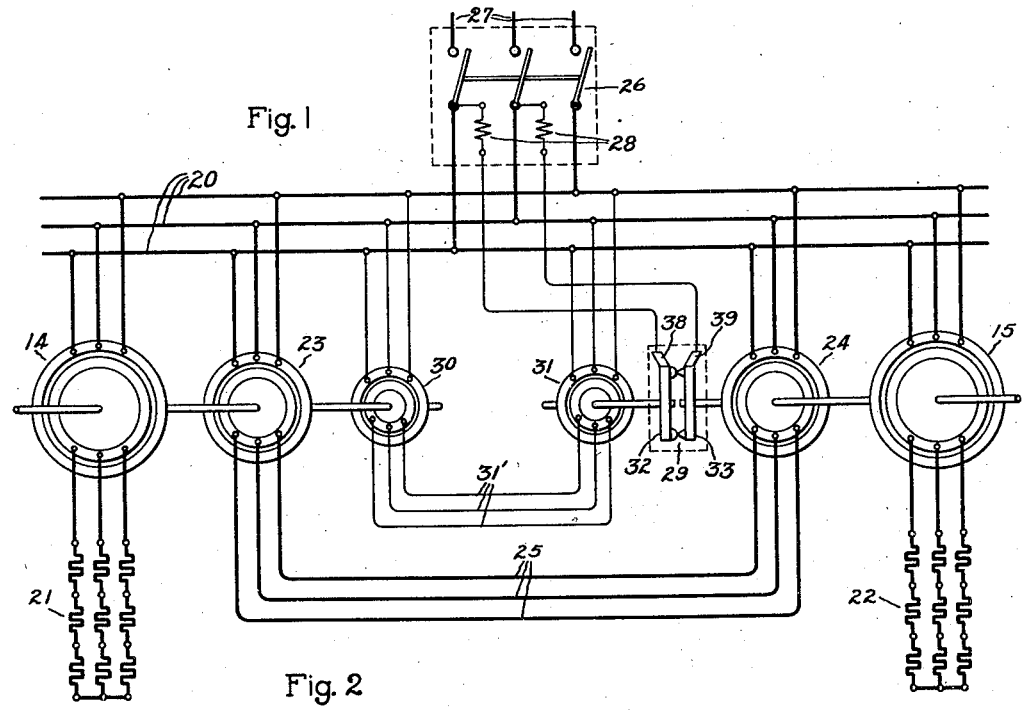
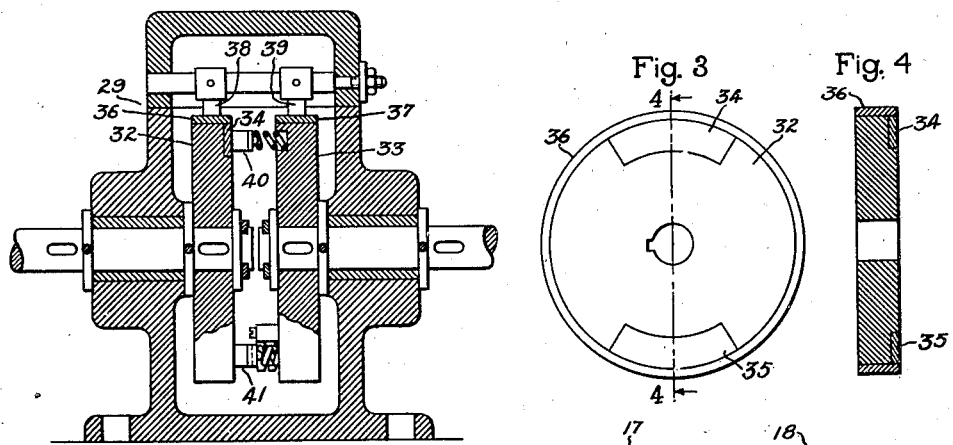
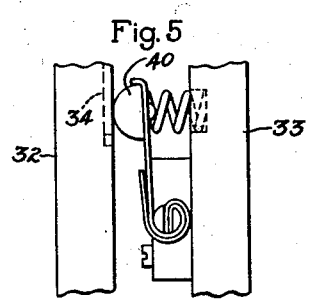
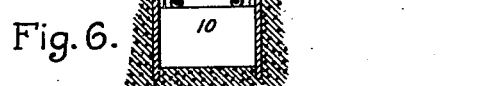
Inventor:
Hans Tengström,
by Charles E. Tullar
His Attorney.

Patented Aug. 15, 1933

1,922,829

UNITED STATES PATENT OFFICE 1,922,829

GATE HOISTING SYSTEM

Hans Tengström, Berlin-Steglitz, Germany, assignor to General Electric Company, a Corporation of New York Application January 20, 1931, Serial No. 510,017, and in Germany January 27, 1930

2 Claims. (Cl. 172—293)

This invention relates to gate hoisting systems for canal locks and the like and has for an object the provision of a simple reliable and efficient system of the kind for preventing one end of the gate from being raised or lowered at a speed different from that of the opposite end.

In the operation of gates of large locks filled with water with ships located therein, the gate operating motors which are usually located on opposite sides of the lock must be operated in exact synchronism. It will readily be understood that the synchronous operation may be obtained by suitable electrical connection of the driving motors and must be maintained under all circumstances in order to prevent the gates from jamming in the guides and thus doing considerable damage to the lock as well as to a ship which may be situated in the lock. The known arrangements for providing synchronous operation of the gate operating motors are usually satisfactory in the case of normal operation. However, upon the slightest disturbance, for example, a short circuit or the like, a relative movement will occur between the rotors of the two driving motors which will effect a difference in the speed of the two ends of the gates with consequent damage to the entire plant.

According to the present invention, a control of the synchronous operation of the motors is effected by means of a rotating switching device which operates to shut down the entire plant upon the maximum permissible angular displacement between the two drive motors being exceeded.

For a better and more complete understanding of the invention reference should now be had to the following specification and to the accompanying drawing in which Fig. 1 is a simple diagrammatical illustration of the control system employed in an embodiment of the invention; Fig. 2 is a view in section of an element of the system; Fig. 3 is a view in elevation of a detail thereof; Fig. 4 is a section taken on the line 4—4 of Fig. 3; Fig. 5 is an enlarged view, partly broken away, of a detail of Fig. 2; and Fig. 6 is a diagrammatical illustration of a practical embodiment of the invention.

Referring now to the drawing, a gate 10 of a canal lock is raised or lowered in the guideways 12, 13 by any suitable driving means such for example as the driving motors 14, 15 which as shown in the drawing are situated on opposite sides of the lock. A suitable winding drum 16 is mounted upon the drive shaft of the motor 14 and one end of the gate 10 is connected to the drum 16 by any suitable means such for example as the cable 17 whilst the opposite end of the gate 10 is arranged to be raised or lowered by means of a cable 18 which is wound upon a suitable winding drum 19 mounted upon the drive shaft of the motor 15. As previously pointed out, in order to prevent the gate 10 from jamming in the guides 12, 13 it is absolutely necessary that the driving motors 14, 15 be operated in exact synchronism with each other. The motors 14, 15 are conventionally shown in the drawing as alternating current motors of the wound rotor type, the primary windings (not shown) of which are supplied with alternating current from any suitable source such for example as that represented in the drawing by the three-phase supply source 20 to which the terminals of the primary windings of these motors are connected as shown. Resistances 21, 22 connected in the secondary circuits of the drive motors 14, 15 are arranged to be cut out by any suitable switching means, either hand controlled or automatic, for the purpose of starting and accelerating the motors.

In order to maintain the motors 14, 15 in synchronism with each other during their normal operation, the two synchronizing motors 23, 24 are respectively mounted upon the shaft of the driving motors 14, 15 and as shown their primary windings are supplied with alternating current from a common source, i. e., the alternating current bus 20, and their secondary windings are interconnected by means of the three conductors 25 as shown in the drawing. As long as the rotors of the two driving motors 14 and 15 operate in synchronism with each other the torque which exists between the rotors and stators of the synchronizing motors 23, 24 will be a minimum and minimum current will flow in the connections 25. However, should the rotor of one of the driving motors 14, 15 tend either to lead or lag the rotor of the other driving motor there will likewise be a tendency for the rotor of one of the synchronizing motors 23 or 24 to lead or lag the rotor of the other synchronizing motor which will disturb the balanced voltage conditions of the secondary windings of these synchronizing motors and consequently a very large current will be caused to flow through the connections 25 and likewise cause a large torque to be exerted between the rotor and stator members of these synchronizing motors which torque will tend to hold the rotors of the main driving motors 14, 15 in synchronism with each other as will be understood by persons skilled in the art. The motors are controlled by any suitable switching device such for example as the hand operated line switch 26 which when operated to its closed position serves to connect the supply buses 20 to any suitable source of supply for example such as that represented in the drawing by the three conductors 27. The switch 26 is provided with suitable undervoltage coils 28 to which the various safety devices (not shown) of the system are connected in the usual well-known manner. A contact device 29 is connected in the circuit of the undervoltage coils 28 and serves to prevent the motors 14, 15 from operating asynchronously with each other; and two auxiliary wound rotor alternating current motors 30, 31 serve to control the operation of the contact device 29. As shown in the drawing the motor 30 is mounted upon the drive shaft of the main driving motor 14 whilst the auxiliary motor 31 is mounted upon a stub shaft of its own. The primary windings of these two motors being supplied from the common bus 20 and their secondary windings being interconnected by means of the three conductors 31' for the purpose of insuring the synchronous operation of these two motors.

The contact device 29 consists of two discs 32 and 33; the disc 32 being mounted upon the stub shaft of the auxiliary motor 31 and the disc 33 being mounted upon the shaft of the main driving motor 15. The inner face of the disc 32 is provided with two contact segments 34, 35 which are displaced 180° from each other as shown. These discs carry peripheral slip rings 36, 37 respectively upon which the brushes 38, 39 make sliding contact. The disc 33 is provided with two spring pressed contact members 40 and 41 which as shown are situated 180° from each other so that they contact with the contact segments 34, 35 on the disc 32. It will thus be seen that the undervoltage release coils 28 of the line switch 26 are included in a circuit which also includes the brushes 38, 39, the contact segments 34, 35 and the cooperating spring pressed contacts 40, 41. As previously pointed out the secondary windings of the two auxiliary motors 30, 31 are inter-connected so that the rotors of these two motors will operate synchronously. Consequently, the disc 32 of the contact device 29 will operate synchronously with the rotor of the drive motor 14 whilst the disc 33 which is mounted upon the shaft of the main driving motor 15 will of course operate synchronously therewith.

As long as both main driving motors 14, 15 operate synchronously with each other the resilient contact members 40, 41 make contact with the contact segments 34, 35 along the center line 4—4. The width of the contact segments 34, 35 is so selected that the greatest permissible angular displacement can occur between the rotors of the two main driving motors 14, 15 without interrupting the circuit of the undervoltage release coil 28. Thus, as long as the drive shafts of the two gate operating motors 14, 15 operate at the same angular speed, the mutual positions of the two discs 32, 33 does not vary and the resilient contact members 40, 41 remain in contact with the contact segments 34, 35 and therefore the circuit for the undervoltage release coil of the line switch remains energized and the switch remains closed. However, should the main driving motor 14, for example, tend to lag the motor 15, the auxiliary motor 31 which operates synchronously with the auxiliary motor 30 and the disc 32, of the contact device 29 will tend to lag behind the motor 15 and the disc 33 of the contact device by the same amount. Consequently the contacts 40, 41 will become disengaged from the contact segment 34, 35 thus opening the circuit of the undervoltage release coil 28 and permitting the line switch 26 to operate to the open position to disconnect supply bus 20 and the motors which are supplied thereby from the source 27.

If the prescribed safety arrangement has responded and if synchronism is only to be restored the next time the drive is started the contact device 29 may be rendered ineffective until synchronism is restored.

What I claim as new and desire to secure by Letters Patent of the United States is:—

1. A gate hoisting system for canal locks and the like comprising a pair of main driving motors mounted on separate shafts for hoisting the opposite ends of the gate, a source of power for said motors, a switching device for connecting said motors with said source, a contact device having a pair of cooperating members arranged in contact with each other, means for driving one of said members synchronously with one of said motors, and means comprising a pair of alternating current motors having their secondaries interconnected for driving the other of said members synchronously with the other of said main motors and means comprising a control circuit including said contact members for opening said switching device to disconnect said main motors from said source upon the occurrence of a predetermined angular relationship between the rotors of said main motors.

2. A gate hoisting system for canal locks and the like comprising a source of alternating current, a pair of main motors mounted on separate shafts for hoisting the opposite ends of the gate, a separate alternating current motor mounted on the shaft of each of said main motors, means comprising electrical connections between the secondaries of said alternating current motors for effecting synchronous operation of said main motors, a contact device comprising a pair of cooperating contact members arranged in contact with each other, means for driving one of said members synchronously with one of said main motors, means comprising an auxiliary alternating current motor mounted on the shaft of the other of said main motors a second auxiliary alternating current motor and connections between the secondaries of said auxiliary motors for driving the other of said contact members synchronously with the other of said main motors, a switching device for connecting all of said motors with said source, and means comprising a control circuit including said contact members for opening said switching device to disconnect all of said motors from said source upon the occurrence of a predetermined angular relationship between the rotors of said main motors.

HANS TENGSTRÖM.